United States Patent
Maryfield et al.

(10) Patent No.: US 9,335,124 B2
(45) Date of Patent: May 10, 2016

(54) COMPACT RIFLESCOPE DISPLAY ADAPTER

(71) Applicant: Cubic Corporation, San Diego, CA (US)

(72) Inventors: Tony Maryfield, Poway, CA (US); Mahyar Dadkhah, San Diego, CA (US); Christian Cugnetti, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/543,761

(22) Filed: Nov. 17, 2014

(65) Prior Publication Data

US 2015/0338191 A1 Nov. 26, 2015

Related U.S. Application Data

(60) Provisional application No. 61/905,628, filed on Nov. 18, 2013, provisional application No. 61/939,638, filed on Feb. 13, 2014.

(51) Int. Cl.
*G02B 27/28* (2006.01)
*F41G 3/00* (2006.01)
(Continued)

(52) U.S. Cl.
CPC .. *F41G 3/00* (2013.01); *F41G 1/30* (2013.01); *F41G 1/38* (2013.01); *G02B 17/008* (2013.01); *G02B 23/14* (2013.01); *G02B 23/16* (2013.01); *G02B 27/283* (2013.01); *G02F 1/13362* (2013.01); *G02F 1/133553* (2013.01); *G06T 11/60* (2013.01); *F41G 11/00* (2013.01)

(58) Field of Classification Search
None
See application file for complete search history.

(56) References Cited

U.S. PATENT DOCUMENTS

| | | | | |
|---|---|---|---|---|
| 6,583,862 | B1 * | 6/2003 | Perger | 356/4.01 |
| 7,175,279 | B2 * | 2/2007 | Drazic et al. | 353/31 |
| 8,363,321 | B1 | 1/2013 | Pochapsky | |
| 2005/0174651 | A1 * | 8/2005 | Spitzer et al. | 359/630 |
| 2007/0081256 | A1 * | 4/2007 | Travers | 359/630 |
| 2011/0026090 | A1 * | 2/2011 | Minor et al. | 359/263 |

(Continued)

OTHER PUBLICATIONS

ISR/WO mailed on Feb. 18, 2015 for International Patent Application No. PCT/US2014/066178 filed on Nov. 18, 2014, all pages.

*Primary Examiner* — Arnel C Lavarias
(74) *Attorney, Agent, or Firm* — Kilpatrick Townsend & Stockton LLP

(57) ABSTRACT

A compact and lightweight riflescope display adapter configured to be affixed in front of the objective lens of a riflescope. The display adapter includes a receptacle that enables the adapter to be electrically connected to a ballistic computer, rangefinder or other targeting mechanism. The display adapter is configured to receive aimpoint information and project illuminated symbology that is brought into focus by the riflescope optics in such a way that the symbology appears to overlay an image of a scene on which the riflescope is focused. The display adapter includes a casing that houses processing circuitry, a light emitting diode, polarizer, polarized beam splitter, liquid crystal on silicon imaging element and reflective element. The display adapter also includes a light bar, spherical mirror, quarter-wave plate and an additional polarized beam splitter contained within the light bar.

20 Claims, 9 Drawing Sheets

(51) Int. Cl.
*G02B 23/14* (2006.01)
*G02B 23/16* (2006.01)
*G02B 17/00* (2006.01)
*G02F 1/1335* (2006.01)
*G06T 11/60* (2006.01)
*F41G 1/30* (2006.01)
*F41G 1/38* (2006.01)
*F41G 11/00* (2006.01)

(56) References Cited

U.S. PATENT DOCUMENTS

2012/0097741 A1 4/2012 Karcher
2013/0279013 A1 10/2013 Edwards et al.
2015/0176948 A1 6/2015 Varshneya et al.
2015/0176949 A1 6/2015 Varshneya et al.

* cited by examiner

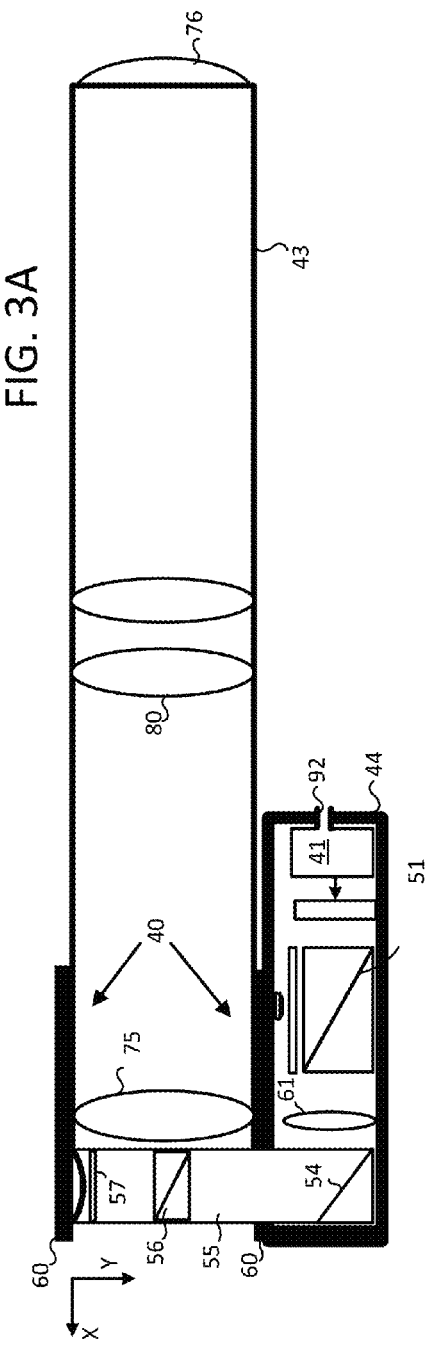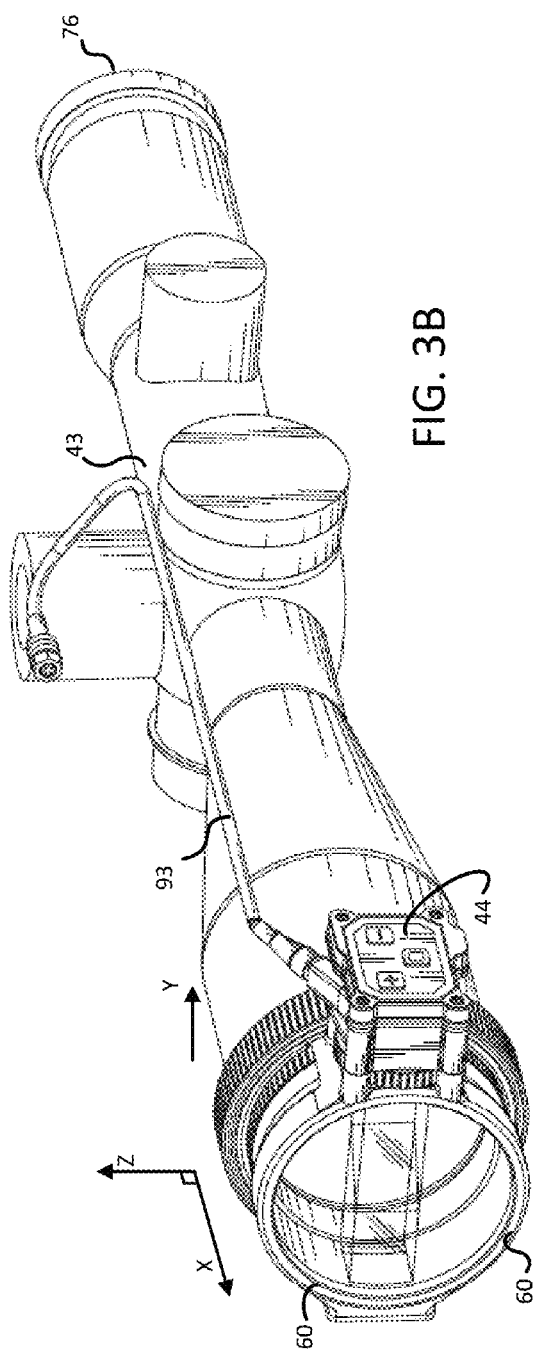

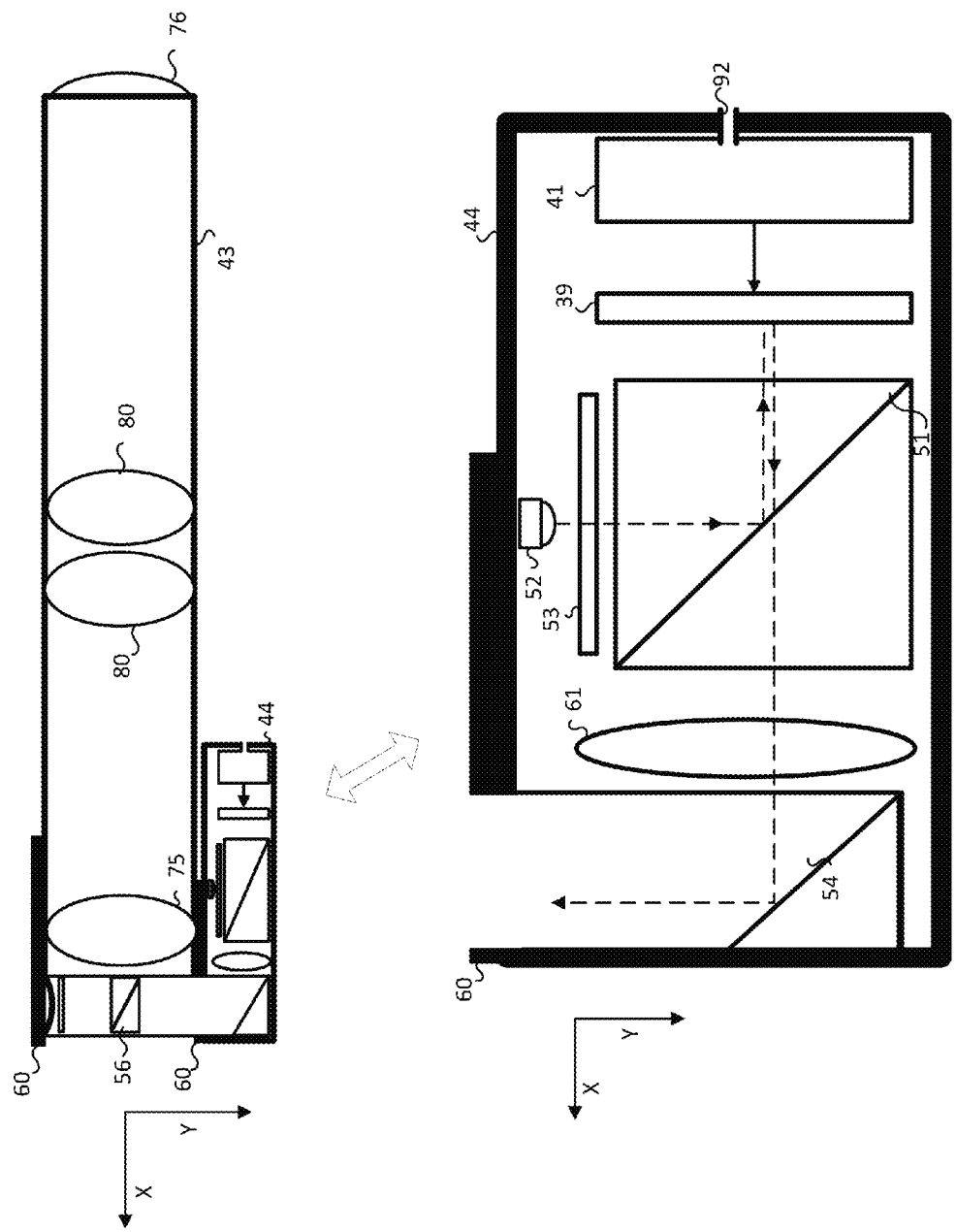

ical Patent Application No. 61/905,628, filed Nov. 18, 2013, and entitled "Compact Riflescope Display Adapter (RDA)" and U.S. Provisional Patent Application No. 61/939,638, filed Feb. 13, 2014, and entitled "Compact Riflescope Display Adapter (RDA)," both of which are incorporated by reference in their entirety for all purposes.

COMPACT RIFLESCOPE DISPLAY ADAPTER

This application is a non-provisional of U.S. Provisional Patent Application No. 61/905,628, filed Nov. 18, 2013, and entitled "Compact Riflescope Display Adapter (RDA)" and U.S. Provisional Patent Application No. 61/939,638, filed Feb. 13, 2014, and entitled "Compact Riflescope Display Adapter (RDA)," both of which are incorporated by reference in their entirety for all purposes.

BACKGROUND

Aspects of the disclosure relate in general to the display of aiming and target selection information through a riflescope.

Current military tactics call for combat snipers to work in close coordination with a spotter as part of a sniper team. The spotter provides protection and situational awareness for the sniper, since the sniper must devote substantial energy and attention to positioning the sniper rifle for an effective shot. Oftentimes, the spotter uses a targeting computer that is designed to provide aiming information appropriate for the sniper rifle being used. Some targeting computers provide the observer with a video feed of the target environment and compute aim point adjustments based on the wind, distance to target, target movement and the ballistic characteristics of the rifle being used.

When utilizing such a targeting computer, the spotter typically provides the sniper with a verbal description of the intended target as well as a vertical and horizontal adjustment factor. The sniper then manually moves the scope of the sniper rifle to reflect the vertical and horizontal adjustment factor. Once the scope is adjusted, the sniper sights the target with the reticle and takes a shot.

BRIEF SUMMARY

An example riflescope display adapter, according to the disclosure, is configured to receive externally computed aimpoint information while affixed to a riflescope, and project an aimpoint symbol based on received aimpoint information such that the symbol overlays an image visible through an eyepiece of the riflescope. The display adapter includes a controllable reflection mechanism comprising multiple reflective elements operable to facilitate display of an aimpoint symbol by reflecting light in response to control signals, and a first polarizing beam splitter operable to facilitate display of an aimpoint symbol by reflecting light towards the reflection mechanism and transmit light reflected by the reflection mechanism. The display adapter also includes a transmissive light bar, the light bar having a first end and a second end, the first end closer to the reflection mechanism than the second end, a first reflective element disposed at the first end of the light bar such that the first reflective element is positioned to reflect light in a first direction, towards the second end of the light bar, and a second reflective element disposed at the second end of the light bar and configured to reflect light in a second direction opposite the first direction. The display adapter further includes a waveplate operable to modify a polarization state of light reflected by the second reflective element; and a second polarizing beam splitter disposed within the light bar and between the first reflective element and the second reflective element, wherein the second polarizing beam splitter is configured to transmit light reflected by the first reflective element such that the light is incident at an objective lens of the riflescope.

The riflescope display adapter can include one or more of the following features, the circuitry can be further configured to compute an illumination position of an aim point symbol by processing received aim point information. The display adapter can further include circuitry configured to facilitate display of an aim point symbol at a computed illumination position by generating signals operable to control reflective elements of the reflection mechanism, a fastening mechanism configured to affix the display adapter to a riflescope; and an annular aperture extending from the fastening mechanism. The second polarizing beam splitter can be disposed so as to be positioned along an extended optical axis of a riflescope when the riflescope display adapter is affixed to the riflescope. The light emitting component can be configured to operate as a light source of an aimpoint symbol. A diffuser can be disposed between the light emitting component and the first polarizing beam splitter, the diffuser operable to diffuse light emitted by the light emitting component. A wire grid polarizer can be disposed between the light emitting component and the first polarizing beam splitter, and configured to polarize light emitted by the light emitting component. The first polarizing beam splitter can be disposed between the reflection mechanism and the first reflective element. The waveplate can be disposed between the second polarizing beam splitter and the second reflective element, and the second reflective element can be a spherical reflective element. The riflescope display adapter can be configured such that light emitted by the light emitting component travels on an optical path that connects the following components in the order listed: the light emitting component, the first polarizing beam splitter, the reflection mechanism, the first reflective element, the second reflective element, and the second polarizing beam splitter.

An example method for presenting an aimpoint symbol visible through an eyepiece of a riflescope, according to the description, can include receiving externally computed aimpoint information that indicates a location at which to display the aimpoint symbol, identifying a combination of reflective liquid crystal on silicon (LCOS) elements operable to reflect light in a manner that facilitates displaying the aimpoint symbol at the location, emitting light by activating a light emitting component, polarizing the emitted light, and using a first polarized beamsplitter to reflect the polarized light towards the LCOS. The method can further include generating control signals operable to cause the reflective LCOS elements of the combination to reflect the polarized light towards the first polarized beamsplitter, wherein the first polarized beamsplitter transmits the polarized light, reflecting the polarized light in a first direction through a transmissive light bar, reflecting the polarized light in a second direction opposite the first direction, and reflecting the polarized light in a third direction approximately perpendicular to the second direction.

The method can further include one or more of the following features. The aimpoint information can specify a horizontal and vertical displacement from a reticle of the riflescope. The horizontal displacement can provide a windage compensation and wherein the vertical displacement provides a bullet drop compensation. A quarter-wave plate can be used to reverse polarity of the polarized light. Reflecting the polarized light in the third direction can be done using a second polarized beam splitter. The LCOS can reverse polarity of the polarized light prior to the polarized light being reflected in a first direction through the transmissive light bar. Reflecting the polarized light in the second direction can be done using a spherical mirror. The third direction can be parallel to an optical axis of the riflescope. Reflecting the polarized light in the third direction can cause the polarized light to be incident on an objective lens of the riflescope. A wire grid diffuser can be used in polarizing the emitted light. The LCOS can be front-lit by the polarized light.

BRIEF DESCRIPTION OF THE DRAWINGS

Aspects of the disclosure are illustrated by way of example. In the accompanying figures, like reference numbers indicate similar elements, and:

FIG. 3A is a block diagram of an example riflescope display adapter depicted relative to components of a riflescope to which the adapter is affixed.

FIG. 3B is a perspective diagram depicting a riflescope to which an example riflescope display adapter is affixed.

FIG. 3C is block diagram of a riflescope display adapter that shows a magnified view of certain adapter components, and depicts a path of light relative to these components.

DETAILED DESCRIPTION

Figure 1A:
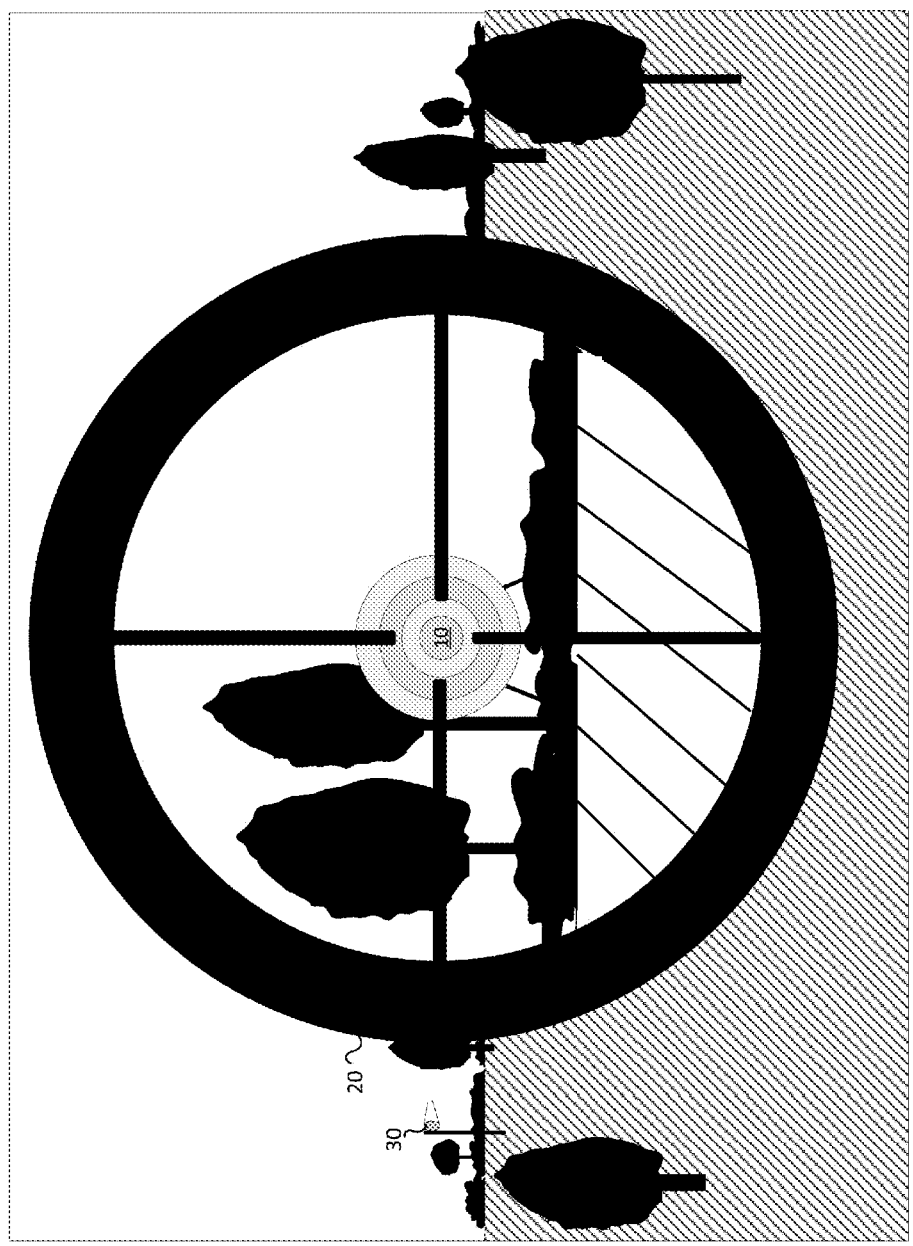
FIG. 1A shows a situation in which a standalone riflescope is used to sight a long-range target in a windy environment.

Several illustrative embodiments of a riflescope display adapter will now be described with respect to the accompanying drawings, which form a part of this disclosure. While particular riflescope display adapter implementations and embodiments are described below, other embodiments and alternative designs may be made without departing from the scope of the disclosure or the spirit of the appended claims.

A lightweight, compact riflescope display adapter can be configured to be securely affixed to a riflescope in front of the scope's objective lens. When attached to a riflescope, the riflescope display adapter (hereinafter also referred to as an "adapter" and a "display adapter") can be operated in an automated aim point assistance mode in which it supplements the riflescope view of the target by displaying aim point or trajectory information computed by a ballistic computer for a selected target.

During operations in the aim point assistance mode, the riflescope display adapter can provide aim point information in the form of illuminated symbology that overlays the target view seen through the eyepiece of the scope. The adapter provides the symbology in such a way that it overlays the view provided by the riflescope optics, without impeding a rifleman's viewing of the target environment. Thus, the adapter enables a conventional scope to be operated as a red dot scope without any modification other than attachment of the adapter to the scope.

The riflescope display adapter can also be operated in a target selection mode. In the target selection mode, the adapter projects target video or other images generated by the ballistic computer or another external device. In that way, the video images can be viewed through the scope eyepiece and used to enhance situational awareness in selecting or identifying a target prior to sighting the target through the scope. The system can display color video generated by ballistic computers capable of video imaging, such as the ballistic computers commonly mounted on sniper rifles or manipulated by spotters while operating in a sniper team environment.

When a spotter works in tandem with a rifleman and operates a ballistic computer to which the adapter is communicatively coupled, operation of the adapter in the target selection mode can be used to view, through the scope, the same video image displayed on the screen of the targeting computer. In this way, a spotter and the rifleman can communicate about an intended target while looking at identical color images, thereby eliminating possible sources of confusion in the process of target selection. Once a target is agreed on, the video can be discontinued and aim point assistance mode can be activated so that the rifleman may view the target scene and aimpoint symbology through the scope.

When targeting selection video is provided, the video images may be displayed so as to consume the entire display optic of the scope, thereby temporally obscuring a direct view of the target environment. Alternatively, the video images can be reduced in size and displayed in such a way as to occupy only a small segment of the display. In this way, a rifleman can simultaneously view the target and video images through the riflescope.

As described in this disclosure, the riflescope display adapter can be configured as a small and lightweight unit that can be tightly fastened to the front end of conventional magnifying riflescopes without entailing any scope modification. Fastening components on the adapter enable it to be quickly attached to and removed from the riflescope without need for equipment such as wrenches or screwdrivers. Thus, the riflescope display adapter enables both red dot riflescope functionality and video projection capabilities to be added to simple riflescopes that were not designed to provide either of these capabilities.

Additionally or alternatively, the riflescope display adapter may include components for mounting the adapter immediately in front of a riflescope objective lens in such a way that the adapter is coupled to and supported by the rifle itself, without being affixed to the scope. This disclosure primarily describes and illustrates embodiments of the riflescope display adapter that include components for affixing the adapter directly to a riflescope. However, in view of these descriptions and drawings, the design of alternative riflescope adapter embodiments that facilitate direct mounting to a rifle would be readily apparent to one of ordinary skill in the art, and are therefore within the scope of this disclosure.

The riflescope display adapter includes optical elements, processing circuitry and cabling. The riflescope display adapter also includes light emitting circuitry. In the aimpoint assistance mode, the light emitting circuitry is the illumination source of the symbology that overlays the image viewed through the riflescope. In the target selection mode, the same light emitting circuitry can be used as the light source for the video imagery projected for viewing through riflescope eyepiece.

The light emitting circuitry provides front lighting of a liquid crystal on silicon element that includes numerous reflective pixels, each of which can reflect incident light in a manner that can be varied by an electrical control signal. Within the riflescope display adapter, the location, intensity, color and shape of aimpoint symbology and video images is controlled by electric signals that vary the reflection provided by individual liquid crystal on silicon (LCOS) reflective elements. By activating a particular combination of reflective elements while other reflective elements are inactive, the adapter projects and directionally controls light for illuminating a symbol or video image viewable through the scope. The riflescope optics focus this projected light in such a way that it appears as overlaying the image of the target or other scene viewed through the scope.

While mounted in front of or attached to the riflescope, the display adapter can be communicatively coupled to a targeting or ballistic computer by way of a connecting cable. The display adapter can be coupled to the computer regardless of whether the computer is mounted on the rifle or detached and independently manipulated by a spotter or observer working in cooperation with a rifleman.

The communicative coupling enables the display adapter to receive aim point and trajectory information computed by a ballistic computer. The aimpoint information may include an aimpoint displacement relative to the riflescope reticle. In this case, processing circuitry within the adapter controls a combination of LCOS optical reflective elements so that light reflected from the LCOS, when focused at the riflescope eyepiece, will be seen to reflect the specified offset relative to the reticle.

Alternatively, the optical system may receive raw image data through the connecting cable. The image data may consist of raw or compressed pixilation data for the display of symbology, video, or still images. The processing circuitry then sets control signals for the LCOS reflective elements so that each signal reflects the corresponding pixel value in the data.

In the aim point assistance mode, the riflescope display adapter may project an aim point indicator symbol so that it is observed as a small illuminated dot that overlays the image of the target. In this way, the rifleman can move the rifle to place the aim point indicator on the target. By moving the rifle in this way, the rifleman can compensate for the computed effect of windage and bullet drop without adjusting the scope, looking away from the scope image, changing hold of the rifle, or manipulating the ballistic computer.

Figure 1B:
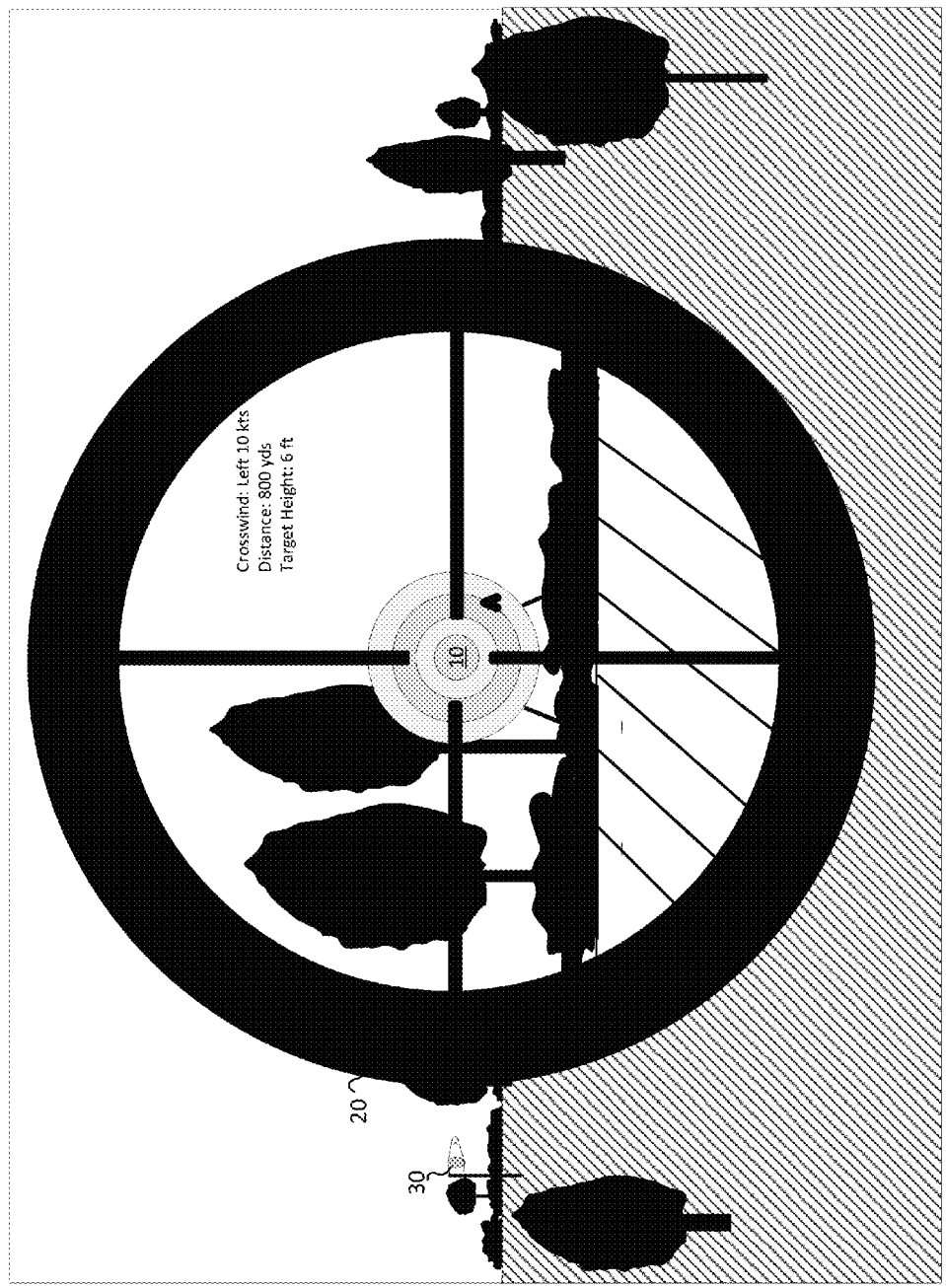
FIG. 1B depicts one example of aim point symbology and trajectory information provided by the riflescope display adapter disclosed herein.
Figure 1C:
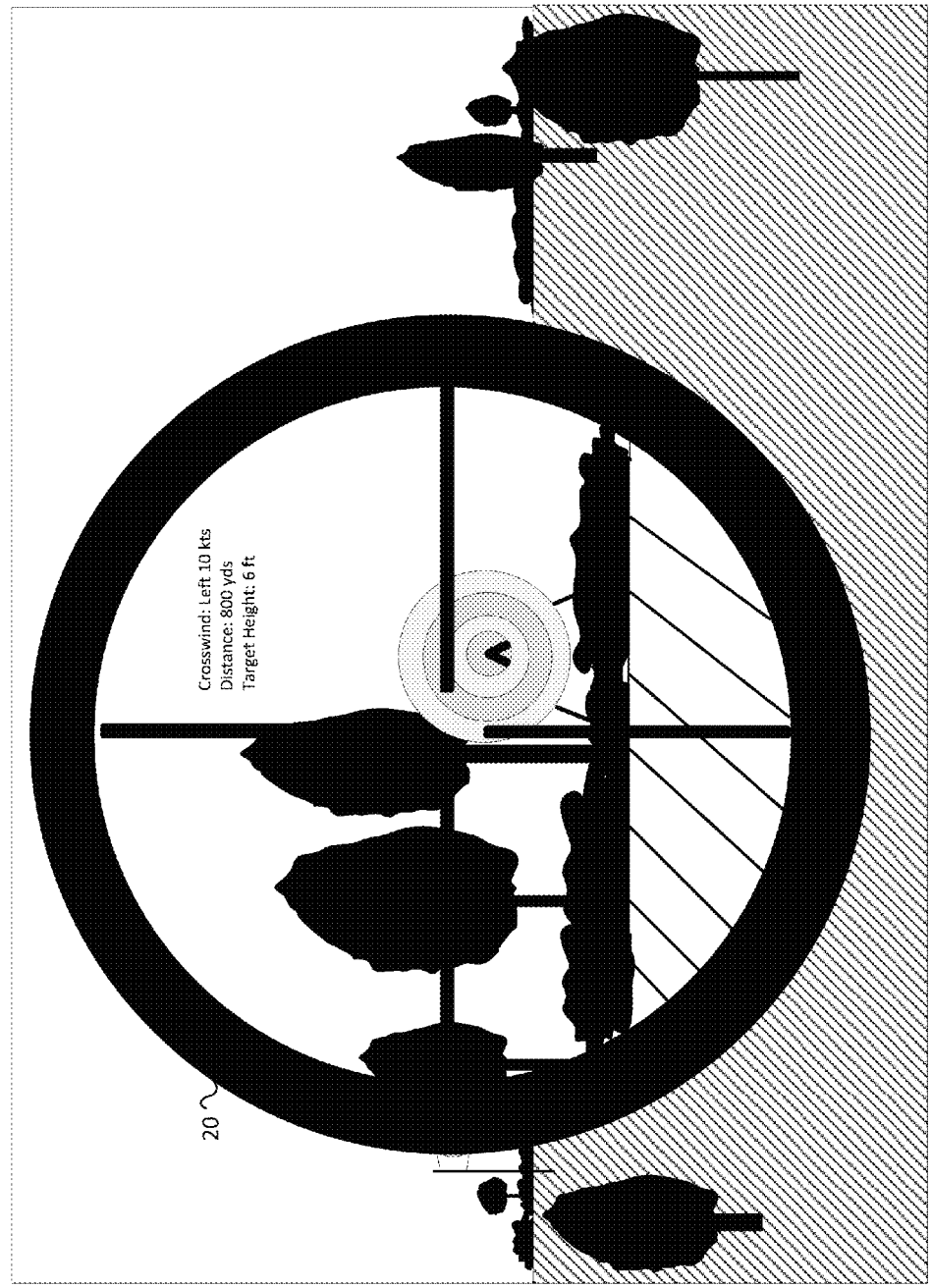
FIG. 1C depicts how a rifleman can properly use symbology and trajectory information provided by the riflescope display adapter to accurately aim a rifle.

FIGS. 1A-1C collectively illustrate one example of the aim point information provided by the riflescope display adapter and demonstrate how this information can be effectively utilized by a rifleman. FIG. 1A shows a view of a long range target 10 as seen through the eyepiece of a standalone magnifying riflescope 20 prior to installation of the riflescope display adapter. As seen in FIG. 1A, the target 10 environment includes a windsock 30 that indicates a strong left crosswind. A shot taken under the circumstances shown in FIG. 1A would drop and move to the right because of the strong left cross-wind and effect of gravity over the lengthy distance to the target 10.

Thus, to hit the target 10 when using the standalone riflescope 20 shown in FIG. 1A, a rifleman could approximate an aimpoint above and to the left of the target 10. The rifleman could approximate the aimpoint based on an estimation of the strength of the left cross-wind and the distance to the target 10. The rifleman could then use the aimpoint by manually aligning the reticle above and to the left of the target 10, but such a methodology is highly inexact. The rifleman could achieve better results by mechanically adjusting the riflescope 20 downwards and to the right. However, making these mechanical adjustments can delay the shot and complicate the aiming process because the rifleman's hands must be removed from the weapon. Also, the mechanical adjustment can only be as precise as the rifleman's mental estimation of the necessary compensation.

Alternatively, the rifleman or an assisting spotter could use a ballistic computer equipped with a laser rangefinder to compute a compensatory scope adjustment. The rifleman would then mechanically adjust the riflescope downwards and to the right by an amount equivalent to the computed adjustment. The adjustment to the scope would cause the rifle to actually be pointed above and to the left of the target when the reticle is seen as aligned with the target according. Although this methodology is precise, it still requires that the rifleman's hands be removed from the weapon prior to the shot being taken.

FIG. 1B shows the view of the target 10 as seen through a riflescope 20 to which the riflescope display adapter (not visible in FIG. 1B) is affixed. As shown in FIG. 1B, the riflescope display adapter is being operated by a rifleman in the aim point assistance mode. Although not depicted in FIG. 1B, the riflescope display adapter is communicatively connected with a ballistic computer (e.g., via wired and/or wireless communication means). The ballistic computer is being operated by a spotter working in the rifleman's vicinity and has computed aimpoint and trajectory information.

The aimpoint information includes a windage adjustment (horizontal), and bullet drop adjustment (vertical). The windage adjustment is effectively a representation of an amount of horizontal displacement between the reticle and the target that the rifleman should observe when the rifle is accurately aimed. Similarly, the elevation adjustment is an indication of an amount of vertical displacement between the reticle and the target when the rifle is accurately aimed.

As seen in FIG. 1B, the display adapter projects trajectory information that overlays the view of the target that the rifleman sees through the scope. In FIG. 1B, the trajectory information includes crosswind information and information about distance to the target and target height.

Similarly, the display adapter illuminates an aimpoint symbol that is projected through the riflescope optics and is also seen as overlaying the view of the target. In projecting the aimpoint symbol (seen as a "^" in FIG. 1B), the riflescope display adapter controls the illumination so that the observed horizontal and vertical displacement of the symbol from the reticle reflects the computed windage adjustment and the elevation adjustment, respectively. Because the aimpoint symbol is aligned below and to the right of the target 10 in FIG. 1B, a shot taken with the rifle aligned as depicted will pass below and to the right of the target if the aimpoint information is accurate.

FIG. 1C illustrates a view of the target 10 as seen through the riflescope 20 after a rifle has been properly aimed so that the aimpoint symbol is aligned with the target. As shown in FIG. 1C, the rifle has been pointed upwards and to the left of the target 10. The aimpoint symbol is now aligned with the target 10 to incorporate the aimpoint adjustment computed by the ballistic computer. If the aimpoint adjustment is accurate and a proper shot is executed, the bullet will strike the center of the target.

Figure 2C:
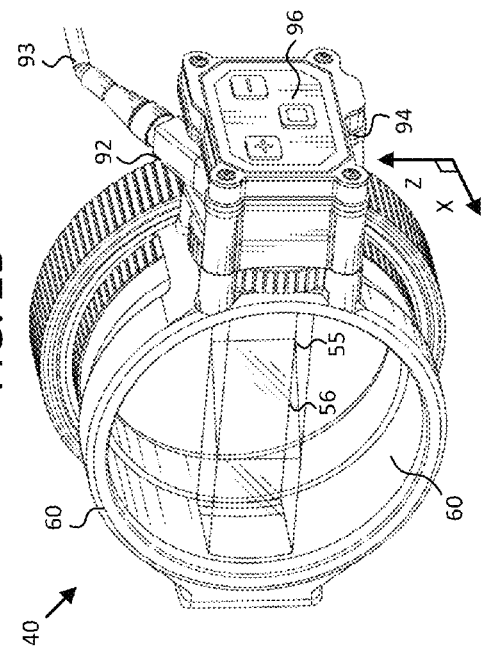
FIG. 2C is an oblique, left-side view of an example riflescope display adapter.
Figure 2B:
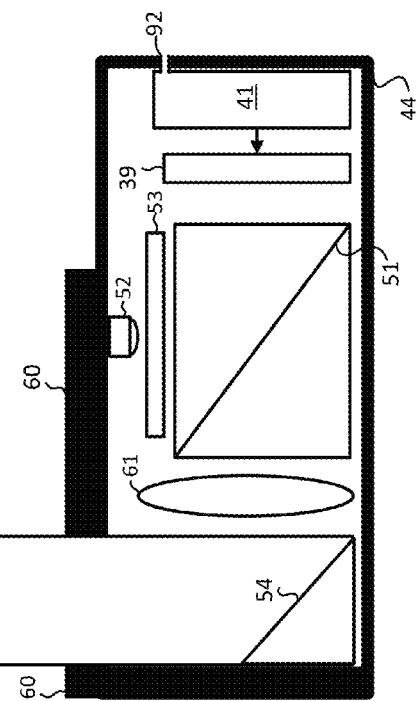
FIG. 2B is a perspective diagram of an example riflescope display adapter.
Figure 2A:
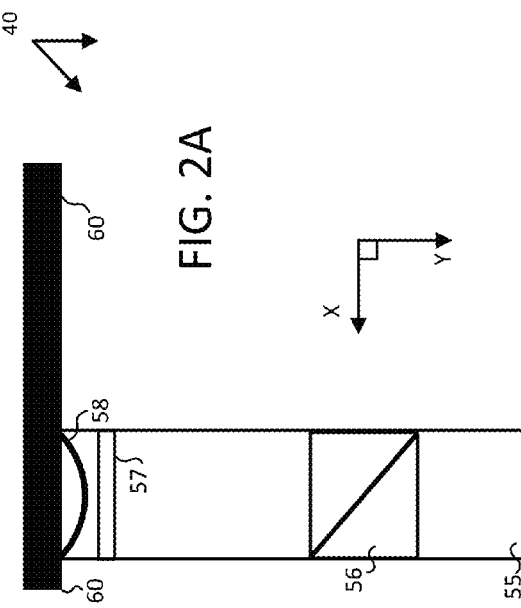
FIG. 2A is a block diagram of an example riflescope display adapter.
Figure 2D:
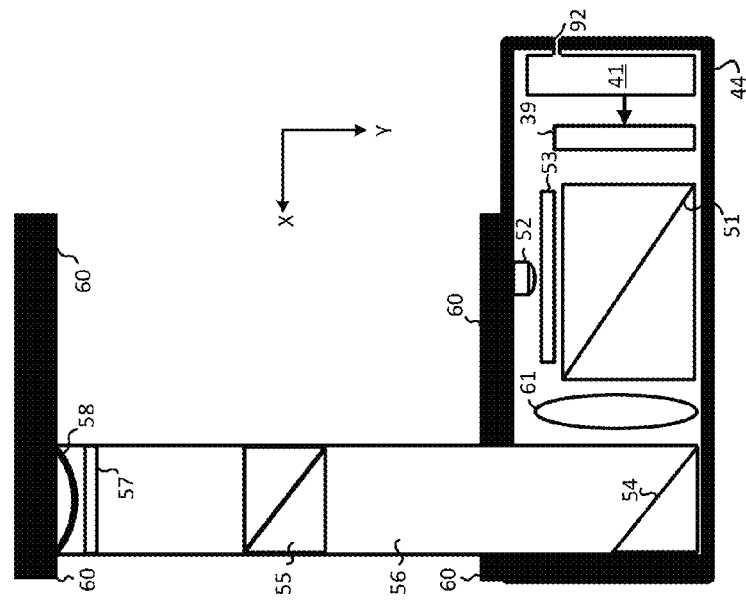
FIG. 2D is a frontal view of an example riflescope display adapter. The block diagram of FIG. 2A is replicated in FIG. 2D, for reference.
Figure 2D:
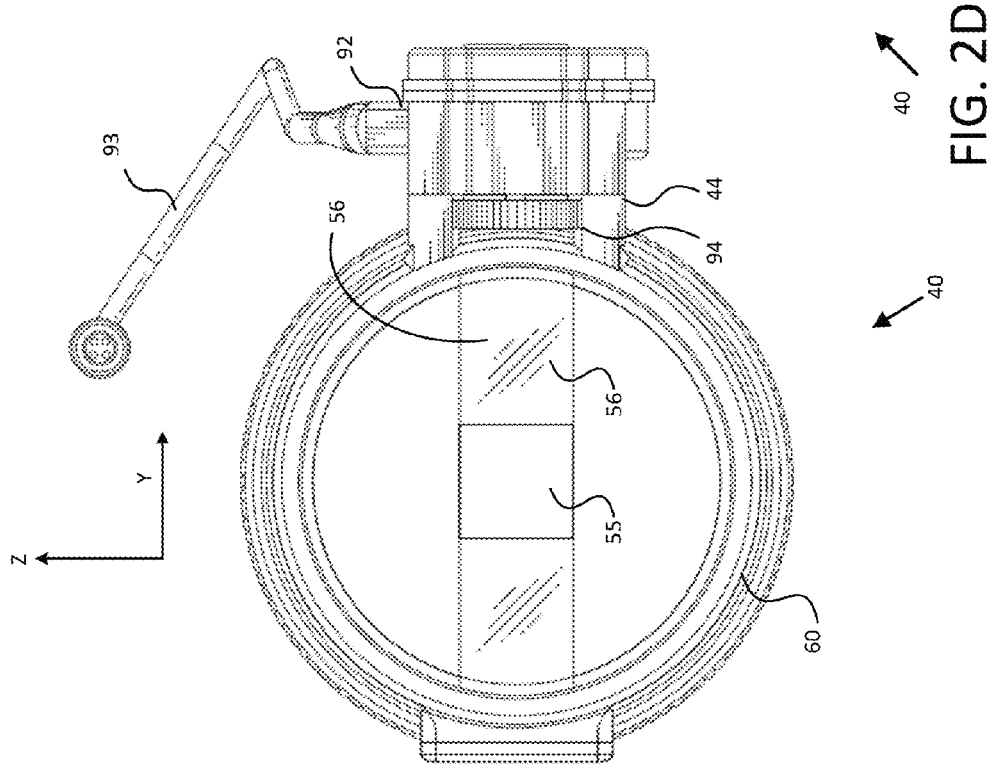

FIG. 2A is a generalized block diagram showing one example configuration of certain light emitting components, optical components, and circuitry in the riflescope display adapter 40. FIG. 2A is intended to be viewed in conjunction with FIGS. 2B, 2C and 2D, which will be described together with FIG. 2A. FIG. 2B is a perspective diagram of the riflescope display adapter 40 from a vantage point to the front and left of the adapter. FIG. 2C is an oblique view of the riflescope adapter 40 as seen from the left side of the adapter. FIG. 2D is a frontal view of the adapter 40. The block diagram of FIG. 2A is replicated in FIG. 2D, for reference. FIGS. 2A, 2B, 2C and 2D depict the riflescope display adapter 40 in a standalone condition in which it is not attached to a riflescope or other rifle mounting point.

In FIG. 2A, certain components are depicted within a casing 44. The casing 44, which is also visible in FIGS. 2B, 2C and 2D, surrounds and encloses these components on all sides, thereby providing protection from the elements, as well as some degree of protection from optical noise and peripheral light that could otherwise interfere with the quality of the images and symbols projected when the display adapter is affixed to a riflescope.

The components depicted within the casing 44 (which are explicitly shown in FIG. 2A) include processing circuitry 41, an LED 52, LCOS 39, diffuser (not shown in FIG. 2A), polarizer 53, polarized beam splitter 51 (referred to hereinafter as a "first polarized beam splitter" to differentiate it from another similar component), moving telephoto lens 61 and reflective element 54. The moving telephoto lens 61 provides parallax adjustment. Through movement of a knob 94 mounted external to the casing 44 and visible in FIGS. 2B-2D, a rifleman can position the telephoto lens 61 as needed to prevent parallax from affecting the view of the target seen through a riflescope. A button interface 96 explicitly depicted in FIGS. 2B and 2C provides an interface to the processing circuitry 41 so that display brightness, display mode, and other display settings can be adjusted.

The image processing circuitry 41 is also used to control, amongst other things, the light emitted by a light emitting diode (LED) 52. The LED 52 emits white light that is the source of the illumination used to project aimpoint symbology and video images when the display adapter 40 is attached to a riflescope. Light emitted by the LED 52 is reflected by the (LCOS) 39. The LCOS 39 includes several thousand reflective crystal elements, each of which is controlled by way of an electrical signal generated by the processing circuitry 41. The processing circuitry 41 controls the display of symbology or video images by using these electrical signals to cause reflections to occur at the LCOS in such a way that the reflected light is focused by the riflescope optics.

In FIG. 2A, these electrical signals are represented by the solid arrow between the processing circuitry 41 and the LCOS 39. The processing circuitry 41 includes a connection port 92 at which a cable can be attached to connect the processing circuitry 41 to an external ballistic computer, targeting, or video generating device. The processing circuitry 41 processes aimpoint and trajectory information, video data or image data received through a cable attached to connection port 92.

In FIGS. 2B, 2C and 2D an intermediate cable 93 is depicted as being connected to the processing circuitry 41 at the connection port 92. The intermediate cable 93 includes a female connecting port through which an electrical connection between a ballistic computer and the processing circuitry 41 of the display adapter 40 may be established. Other embodiments may additionally or alternatively include wireless communication means, such as a radio frequency (RF) transceiver, antenna, and/or the like.

The processing circuitry 41 may be designed to access aimpoint and trajectory information in the form of raw data representative of an aimpoint symbol display location. The display location may be specified as an offset from a riflescope reticle. For the purposes of this disclosure, the riflescope reticle refers to fixed crosshairs that are seen at the center of a riflescope image, or, more generally, to the center of the image seen through a scope. The aimpoint and trajectory information may alternatively be in the form of pixel data representing an image having an aimpoint symbol positioned to compensate for computed windage and bullet drop.

FIG. 2A also depicts other optical components external to the casing 44, several of which are also depicted in FIGS. 2B-2D. These components include a transmissive light bar 55, an additional polarized beam splitter 56 (hereinafter "second polarized beam splitter"), a spherical mirror 58 and a quarter-wave plate 57. As can be seen in FIG. 2B, the light bar 55 diametrically traverses an annulus 60 on which the casing 44 is mounted. As will be illustrated in other drawings provided herein, the annulus 60 is configured to extend forward of a riflescope's objective lens when the display adapter 40 is affixed to the scope. When the display adapter 40 is attached to a riflescope, an aperture in the annulus 60 allows light from the scene to pass unimpeded to the objective lens of the scope. In this way, the optics of the scope can focus an image of the target at the eyepiece.

A series of arrows in three dimensions is also shown in FIG. 2A. This series of arrows is intended to provide a directional reference system that is consistent across multiple different viewing angles manifested in the drawings provided herein. These arrows (X, Y, and Z) are presented throughout the drawings in a manner that is consistent with respect to the components of the riflescope display adapter, despite the difference in viewing angles from one drawing to the next.

FIG. 3A is a block diagram that shows the riflescope display adapter 40 in a condition in which it is affixed to a riflescope 43. Other than for the fact that FIG. 3A shows the adapter 40 components relative to components of the riflescope 43 to which the adapter 40 is affixed, the diagram of the display adapter 40 in FIG. 3A mirrors the diagram in FIG. 2A. FIG. 3B, which is meant to be viewed in conjunction with FIG. 3A, is a perspective diagram of the display adapter 40 of FIG. 3A and the riflescope 43 to which it is affixed. FIG. 3B represents a view of display adapter 40 and riflescope 43 as seen from slightly to the front and left of the riflescope 43.

As shown in FIGS. 3A and 3B, the riflescope 43 includes an objective lens 75 and additional magnifying lenses 80. The riflescope 43 also includes an eyepiece 76 through which an image of a target or scene can be viewed. Moreover, symbols, images and video can be projected by the display adapter 40 and focused by the riflescope 43 optics so as to be visible at the eyepiece 76. The display adapter 40 can provide these projections so that they overlay the view of the target or occupy the entire eyepiece 76.

The riflescope display adapter 40 shown in FIGS. 3A and 3B is affixed to the riflescope 43 with the annulus 60 of the adapter 40 surrounding the sides of the riflescope 43 at the target end of the rifles cope 43. A portion of the annulus 60 extends slightly forward of the objective lens 75, in the direction of the target (x-direction, as shown by the dashed arrow). Also, the light bar 55 traverses the aperture of the annulus 60 at a point slightly forward of the objective lens 75. It is important to note that several display adapter components previously depicted in FIG. 2A are also shown in FIG. 3A, but are too small to be labeled.

Figure 3D:
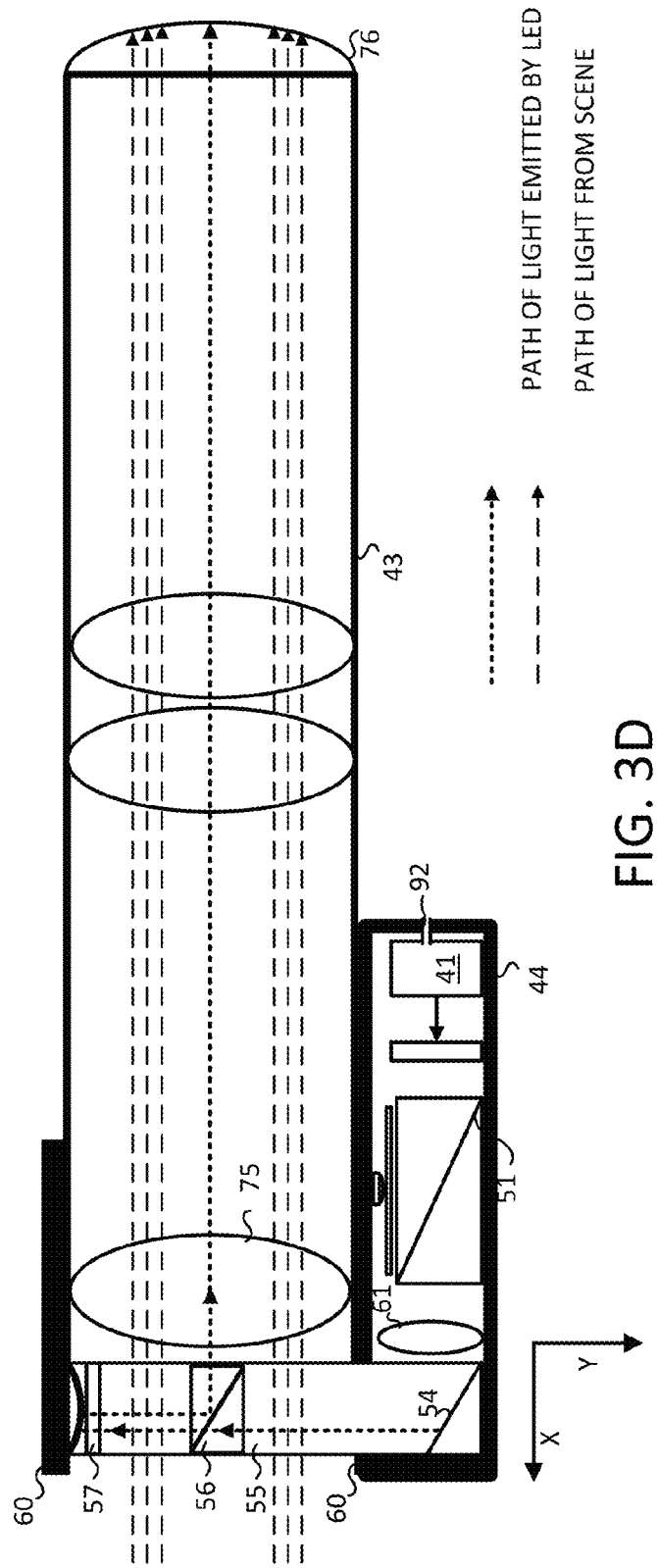
FIG. 3D is a block diagram that shows an example light path relative to components of a riflescope display adapter and components of a riflescope to which the adapter is affixed.

FIG. 3C includes the depiction of the riflescope display adapter 40 affixed to a riflescope 43, as previously seen in FIG. 3A. FIG. 3C also shows a magnified view of the riflescope display adapter 40 components enclosed by the casing 44, as well as a first portion of a path of light emitted by the LED 52 during illumination of an aimpoint symbol projected by the adapter 40 and focused at the riflescope eyepiece 76. A second part of this path will be shown in FIG. 3D.

The depiction of the path of light in FIGS. 3C and 3D is highly generalized and is not intended show angles of incidence, reflection and refraction. As such, these drawings should be understood as exhibiting only an approximate path of light relative to the various components of the riflescope display adapter 40, as well as depicting certain adapter components that reflect the light within the casing 44 and certain components that transmit the light.

For example, FIG. 3C depicts that after light is emitted by the LED 52, it is transmitted and polarized by the polarizer 53. As a result of the polarization of the light that occurs at the polarizer 53, the light is reflected towards the LCOS 39 at the first polarized beam splitter 51. While the processing circuitry 41 controls the reflective pixel elements of the LCOS 39, various active pixel elements reflect the light back in the direction of the first polarized beam splitter 51.

After being reflected at the LCOS 39, the light is transmitted by both the first polarized beam splitter 51 and the moving telephoto lens 61. The reflective element 54 then reflects the light into the light bar 55.

FIG. 3D provides a generalized illustration of a second portion of the path of light illustrated in FIG. 3C. The second portion of the path of light begins at reflective element 54, at which point the light enters the light bar 55. Thus FIG. 3D is intended to be viewed in combination with FIG. 3C, which depicts the path of the light ray prior to its exit from the casing 44 of the display adapter 40. As shown in FIG. 3D, the light enters the light bar 55 after being reflected at reflective element 54, is transmitted at the second polarizing beam splitter 56 and is reflected by the spherical mirror 58.

The light undergoes a polarity reversal imparted by the quarter-wave plate 57 and is then incident on the second polarizing beam splitter 56. The second polarizing beam splitter 56 reflects the light towards the objective lens 75 of the riflescope. The light is incident on the objective lens 75 near the center of the lens, while light from the scene is incident on the objective lens 75 between the center and periphery of the lens. The magnifying 80 lenses of the riflescope then refract and focus the light projected by the display adapter 40, as well as the light emanating from the scene. In this way, the light projected by the display adapter 40 is brought into focus as a symbol or image visible at the eyepiece 76 of the riflescope. Simultaneously, the light emanating from the scene is brought into focus at the eyepiece 76. In this way, a rifleman is able to see a magnified view of the target with an overlaid aimpoint symbol or other image while looking through the riflescope 43.

Figure 4:
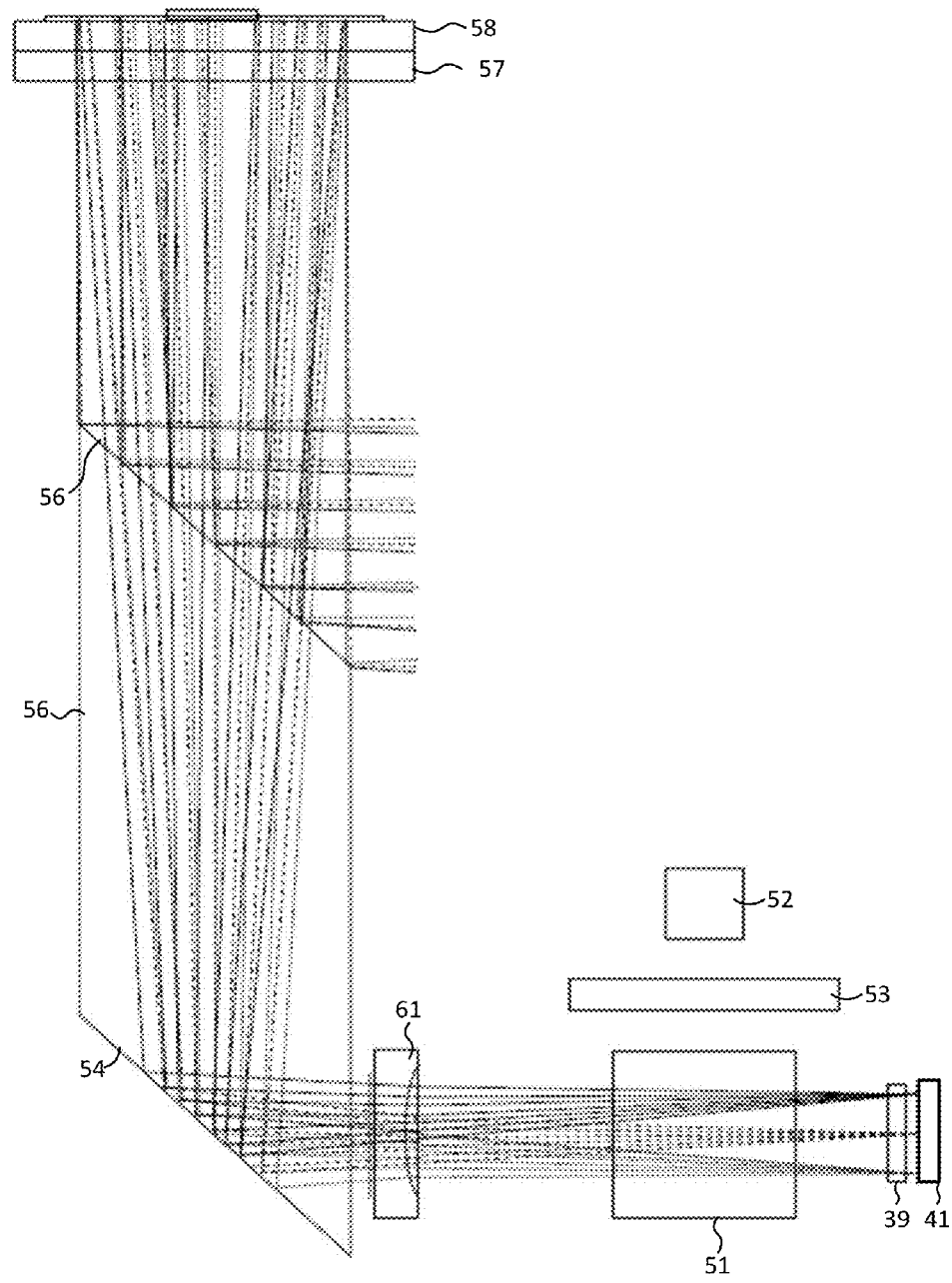
FIG. 4 is a diagram showing example paths of light rays within a riflescope display adapter.

FIG. 4 is a schematic diagram showing the path of light rays in the riflescope display adapter 40 during projection of a symbol or image visible through a riflescope. In FIG. 4 depiction of the light emitted by the LED and the reflection of this light towards the LCOS 39 is omitted in order to avoid unnecessary complication of the drawing. Rather, the rays shown in the drawing are intended to illustrate the path of light only after its reflection at the LCOS 39. Additionally, the light path through the riflescope is omitted in FIG. 4.

Although not shown, the LED 52 emits light towards a polarizing beam splitter 51 that is angled 45 degrees relative to the path of the light. Prior to reaching the first polarizing beam splitter 51, the light can be polarized by the polarizer 53. Optionally, the light may be diffused by a diffuser prior to reaching the first polarizing beam splitter 51 (e.g., the diffuser is disposed between the LED 52 and the polarizing beam splitter 51), before or after the polarizer 53. In some embodiments the polarizer 53 may also act as a diffuser.

Also, a wire grid polarizer (not shown) is used to polarize the light in such a way that it will be reflected at the first polarizing beam splitter 51. Because of the polarity of the light incident on the first polarizing beam splitter 51, the beam splitter reflects the light towards the LCOS 39 (leftwards, as viewed in FIG. 4).

The processing circuitry 41 generates electrical control signals that cause a combination of LCOS reflective pixel elements to reflect the incident light. The LCOS 39 also reverses the polarity of the light that it reflects. The light reflected by the LCOS 39 is reflected back towards the first polarizing beam splitter 51, where it is transmitted as a result of the polarity reversal imparted by the LCOS 39.

After being transmitted by the first polarized beamsplitter 51, the light propagates towards a moving telephoto lens 61 that provides parallax adjustment. The light is divergently refracted by the telephoto lens 61 in a manner that provides compensation sufficient to prevent parallax from affecting the riflescope view.

Subsequent to being transmitted by the telephoto lens 61, the light is incident on a reflective element 54 that is disposed at an angle that is approximately 45 degrees from parallel to the path of the light. The reflection of the light by the reflective element 54 causes an approximately 90 degree change in direction of the light. Following reflection, the light propagates through light bar 55. The light bar 55 may be shaped as a rectangular prism formed of a transmissive material that surrounds a second polarized beam splitter 56.

The second polarized beam splitter 56 is disposed within the light bar 55, and is approximately centered with respect to the circular aperture (not shown in FIG. 4.) of the annulus. By being centered with respect to the circular aperture, the second polarizing beam splitter 56 is disposed so that it will coincide with an extended optical axis (not explicitly labeled) of the riflescope 43 to which the adapter 40 is affixed. That is, the second polarizing beam splitter 56 will be disposed directly in front of the center of the riflescope objective lens (not shown in FIG. 4).

As a result of the polarity of the light when reflected at reflective element 54, the light is transmitted by the second polarizing beam splitter 56 and is incident on the spherical mirror 58 disposed at the end of the light bar 55 opposite the reflective element 54. The spherical mirror 58 reflects the light towards the second polarizing beam splitter 56 and reverses the polarity of the light. Also, a quarter-wave plate 57 is disposed between the second polarizing beam splitter 56 and the spherical mirror 58. The quarter-wave plate reverses the polarity of the light.

As a result of the polarity reversal imparted by the quarter-wave plate 57, the second polarizing beam splitter 56 reflects the light, causing a 90 degree change in direction. As can be seen in FIG. 4, the light rays are effectively collimated by the reflection that occurs at the spherical mirror 58 and second polarizing beam splitter 56. These collimated light rays are then incident at the objective lens of the riflescope (not shown), which transmits and refracts the rays towards the optical eyepiece in the manner depicted in FIG. 3D.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Furthermore, various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation. Features described with respect to certain configurations may be combined in various other configurations. Different aspects and elements of the configurations may be combined in a similar manner. Also, technology evolves and, thus, many of the elements are examples and do not limit the scope of the disclosure or claims.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

While the principles of the disclosure have been described above in connection with specific embodiments, it is to be clearly understood that this description is made only by way of example and not as limitation on the scope of the disclosure. Additional implementations and embodiments are contemplated. For example, the techniques described herein can be applied to various forms of optical devices, which may comprise a smaller portion of a larger optical system. Yet further implementations can fall under the spirit and scope of this disclosure.

Specific details are given in the above description to provide a thorough understanding of the various embodiments of the described methods, techniques and systems. However, it is understood that certain such embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

While the principles of the disclosure have been described above in connection with specific apparatuses and methods, it is to be clearly understood that this description is made only by way of example and not as limitation on the scope of the disclosure.

What is claimed is:

1. A riflescope display adapter configured to:
   receive externally computed aimpoint information while affixed to a riflescope; and
   project an aimpoint symbol based on received aimpoint information such that the symbol overlays an image visible through an eyepiece of the riflescope, wherein the display adapter comprises:
      a controllable reflection mechanism comprising multiple reflective elements operable to facilitate display of the aimpoint symbol by reflecting light in response to control signals;
      a first polarizing beam splitter operable to:
         facilitate display of the aimpoint symbol by reflecting light towards the reflection mechanism; and
         transmit light reflected by the reflection mechanism;
      a transmissive light bar, the light bar having a first end and a second end, the first end closer to the reflection mechanism than the second end;
      a first reflective element disposed at the first end of the light bar such that the first reflective element is positioned to reflect light in a first direction, towards the second end of the light bar;
      a second reflective element disposed at the second end of the light bar and configured to reflect light in a second direction opposite the first direction;
      a waveplate operable to modify a polarization state of light reflected by the second reflective element; and
      a second polarizing beam splitter disposed within the light bar and between the first reflective element and the second reflective element, wherein the second polarizing beam splitter is configured to transmit light reflected by the first reflective element such that the light is incident at an objective lens of the riflescope.

2. The riflescope display adapter of claim 1, further comprising:
   circuitry configured to:
      compute an illumination position of the aimpoint symbol by processing received aimpoint information, and
      facilitate display of the aimpoint symbol at a computed illumination position by generating signals operable to control reflective elements of the reflection mechanism;
   a fastening mechanism configured to affix the display adapter to a riflescope; and
   an annular aperture extending from the fastening mechanism.

3. The riflescope display adapter of claim 1, wherein further, the second polarizing beam splitter is disposed so as to be positioned along an extended optical axis of a riflescope when the riflescope display adapter is affixed to the riflescope.

4. The riflescope display adapter of claim 1, wherein further, a light emitting component is configured to operate as a light source of the aimpoint symbol.

5. The rifles cope display adapter of claim 1, further comprising:
   a diffuser disposed between a light emitting component and the first polarizing beam splitter, the diffuser operable to diffuse light emitted by the light emitting component.

6. The rifles cope display adapter of claim 1, further comprising:

a wire grid polarizer disposed between a light emitting component and the first polarizing beam splitter, and configured to polarize light emitted by the light emitting component.

7. The riflescope display adapter of claim 1, wherein:
the first polarizing beam splitter is disposed between the reflection mechanism and the first reflective element.

8. The riflescope display adapter of claim 1, wherein:
the waveplate is disposed between the second polarizing beam splitter and the second reflective element; and
second reflective element is a spherical reflective element.

9. The riflescope display adapter of claim 1, wherein the display adapter is configured such that light emitted by a light emitting component travels on an optical path that connects the following components in the order listed:
the light emitting component;
the first polarizing beam splitter;
the reflection mechanism;
the first reflective element;
the second reflective element; and
the second polarizing beam splitter.

10. A method for presenting an aimpoint symbol visible through an eyepiece of a riflescope, the method comprising:
receiving externally computed aimpoint information that indicates a location at which to display the aimpoint symbol;
identifying a combination of reflective liquid crystal on silicon (LCOS) elements operable to reflect light in a manner that facilitates displaying the aimpoint symbol at the location;
emitting light by activating a light emitting component;
polarizing the emitted light;
using a first polarized beamsplitter to reflect the polarized light towards the LCOS;
generating control signals operable to cause the reflective LCOS elements of the combination to reflect the polarized light towards the first polarized beamsplitter, wherein the first polarized beamsplitter transmits the polarized light;
reflecting the polarized light in a first direction through a transmissive light bar;
reflecting the polarized light in a second direction opposite the first direction; and
reflecting the polarized light in a third direction approximately perpendicular to the second direction.

11. The method of claim 10, wherein the aimpoint information specifies a horizontal and vertical displacement from a reticle of the riflescope.

12. The method of claim 11, wherein the horizontal displacement provides a windage compensation and wherein the vertical displacement provides a bullet drop compensation.

13. The method of claim 10, further comprising using a quarter-wave plate to reverse polarity of the polarized light.

14. The method of claim 10, wherein reflecting the polarized light in the third direction is done using a second polarized beam splitter.

15. The method of claim 10, wherein the LCOS reverses polarity of the polarized light prior to the polarized light being reflected in a first direction through the transmissive light bar.

16. The method of claim 10, wherein reflecting the polarized light in the second direction is done using a spherical mirror.

17. The method of claim 10, wherein the third direction is parallel to an optical axis of the riflescope.

18. The method of claim 10, wherein reflecting the polarized light in the third direction causes the polarized light to be incident on an objective lens of the riflescope.

19. The method of claim 10, wherein a wire grid diffuser is used in polarizing the emitted light.

20. The method of claim 10, wherein the LCOS is front-lit by the polarized light.

* * * * *